United States Patent [19]

Durrant

[11] Patent Number: 4,564,358
[45] Date of Patent: Jan. 14, 1986

[54] NON-INCREMENTAL CLUTCH ADJUSTMENT ARRANGEMENT

[75] Inventor: John T. Durrant, Schaghicoke, N.Y.

[73] Assignee: Garden Way Incorporated, Troy, N.Y.

[21] Appl. No.: 611,321

[22] Filed: May 17, 1984

[51] Int. Cl.$^4$ .............................................. F16H 7/08
[52] U.S. Cl. ..................................... 474/101; 474/75; 474/115
[58] Field of Search ................ 474/101, 113, 75, 115, 474/119, 124, 125, 128, 129, 135, 138; 180/231; 56/16.7

[56] References Cited

U.S. PATENT DOCUMENTS

| | | | |
|---|---|---|---|
| 2,133,512 | 10/1938 | Herge | 474/135 X |
| 2,419,850 | 4/1947 | Norton | 474/75 |
| 2,545,781 | 3/1951 | Hesterberg | 474/115 X |
| 2,689,620 | 9/1954 | Hainke | 474/75 X |
| 2,997,890 | 8/1961 | Burrows et al. | 474/117 |
| 3,057,216 | 10/1962 | Smith | 474/75 |
| 3,062,065 | 11/1962 | Shaw | 474/75 |
| 3,921,373 | 11/1975 | Rubin | 56/16.7 X |
| 4,324,552 | 4/1982 | Bouskek, Jr. et al. | 474/115 X |

Primary Examiner—Stephen J. Novosad
Assistant Examiner—Thuy M. Bui
Attorney, Agent, or Firm—Hayes & Reinsmith

[57] ABSTRACT

A belt tensioning adjustment assembly for a powered unit including a operating lever and a rotably supported wheel over which a cable passes and friction locking means is provided for fixing the rotated position of the wheel thereby to effect selective non-incremental adjustment of the cable length. The non-incremental adjustment of the cable length allows a drive belt tensioning lever to effect deflection of a belt drive and to effect driving engagement of a motor shaft to a work attachment unit.

11 Claims, 3 Drawing Figures

NON-INCREMENTAL CLUTCH ADJUSTMENT ARRANGEMENT

BACKGROUND OF THE INVENTION

The present invention relates to belt drive tensioning mechanisms for use in a clutching arrangement and more specifically relates to an improved mechanism for non-incrementally adjusting a belt drive tensioning mechanism to engage a power output shaft to a load or work unit as well as specific devices utilizing such a mechanism.

Clutching mechanism of this general type are known in the prior art as illustrated in the following U.S. patents: U.S. Pat. No. 2,133,512 issued to Herge effects clutching action by movement of the lawn-mower handle; Hesterberg U.S. Pat. No. 2,545,781 effects clutching by actual shifting of the drive motor; U.S. Pat. Nos. 2,997,890 (Bunows et al) and 4,324,552 (Bouslick) use a rod arrangement for clutching; and flexible member is used by Rubin in U.S. Pat. No. 3,921,373 to effect clutching in a power rake.

It is also known to provide incremental adjustment for clutch operating mechanisms, which increments depend upon the spacing of connecting holes or positioning slots in a rod-type operator or spacing of links in a chain operator.

OBJECTS OF THE INVENTION

A principle object of the invention is to provide an improved non-incremental drive belt tensioning mechanism, particularly useful in effecting selective engagement of a powered shaft with a work unit.

A further object of the invention is to provide an improved belt drive between a power output shaft and a work unit which is non-incrementally adjustable to compensate for belt wear, belt stretching and variations in pulley dimensions.

Yet another object is to provide an improved drive belt tension adjuster having a member engageable with the drive belt to effect controlled, non-incremental deflection of the drive belt to effect the power output shaft to be selectively engageable with a work unit.

Yet another object of this invention is to provide a drive belt tension adjuster which is economical and simple to use and manufacture for reliable operation over an extended service life.

Other objects will be in part obvious and in part pointed out in more detail hereinafter.

A better understanding of the objects, advantages, features, properties and relations of the invention will be obtained from the following detailed description and accompanying drawings which set forth illustrative embodiments and are indicative of the way in which the principles of the invention are employed.

DESCRIPTION OF A PREFERRED EMBODIMENT

Figure 1:
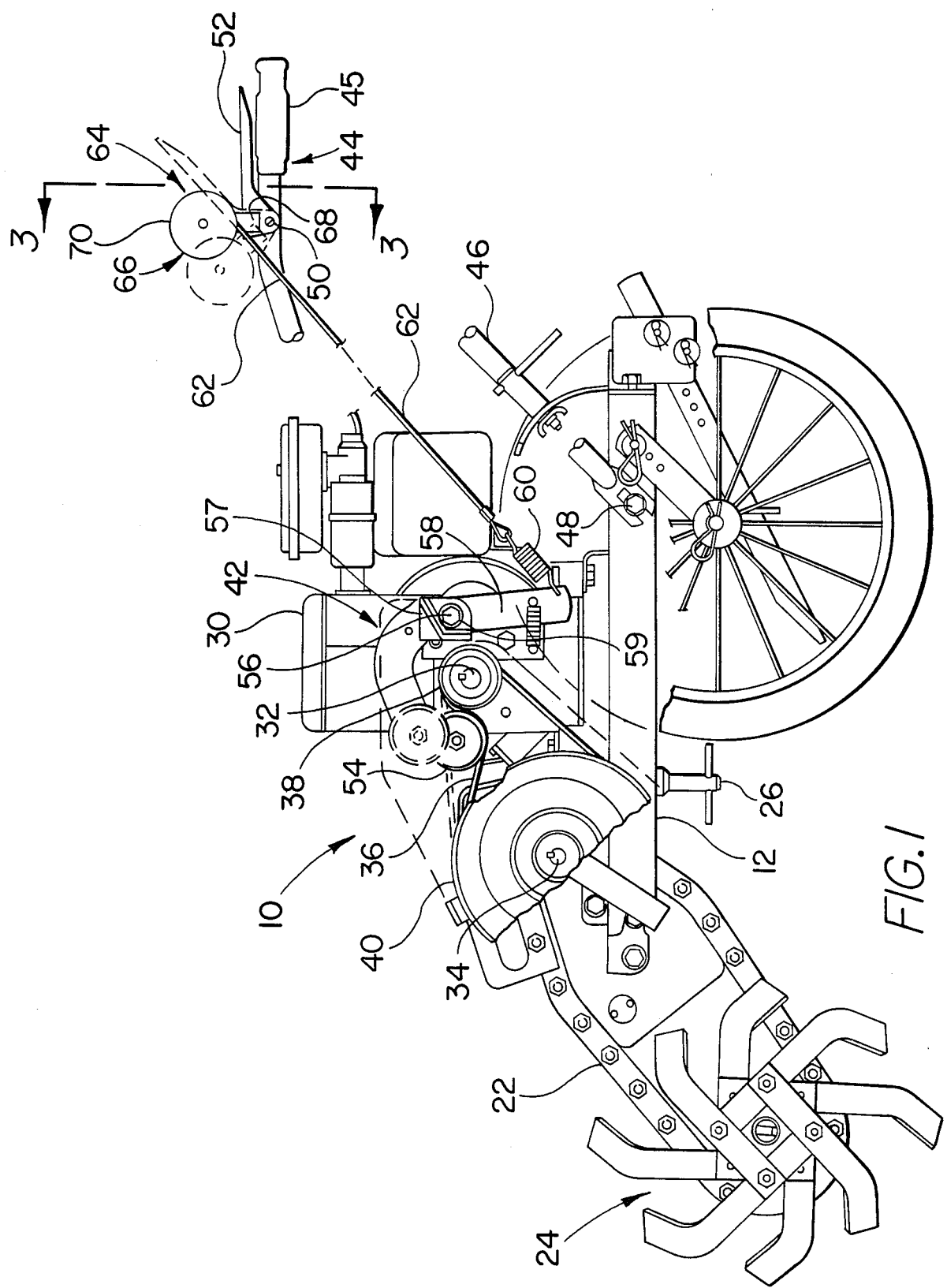
FIG. 1 is an elevational view, partly broken away, of a power output unit showing a preferred embodiment of the belt tension adjustment mechanism and illustrating the engagement position of the lever and drive engagement mechanism in solid lines and illustrating the non-engagement positions of the lever and drive engagement mechanism in dashed lines.

Referring now to the drawings in detail, FIG. 1 illustrates a powered apparatus indicated in its entirety by the reference numeral 10. Apparatus 10 includes a main frame defined by parallel channeled members 12 and 14, respectively, having inner vertical flanges 16 and 18 disposed on opposite sides of a chain case 22 which inclines from a location above the front end, to a location beneath, the frame 12. A work unit 24, here shown as a tiller assembly, is connectable to frame 12 by means of a quick attachment assembly 26. Other work units are adaptable for use with powered apparatus 10.

Mounted on frame 12 is an internal combustion engine 30 having an output shaft 32. A drive belt 36 is provided for transferring the rotation of shaft 32 to a shaft 34, which is journalled in the upper end of a chain case 22. Drive belt 36 is disposed about a small pulley 38 fixed to shaft 32 and a larger pulley 40 attached to shaft 34 in a fore-and-aft alignment with pulley 38. A belt tensioning mechanism, generally indicated by numeral 42, is provided for selectively establishing a slack non-power transmitting condition in belt 36 or an engaging power transmitting condition in belt 36.

The apparatus includes a rearwardly projecting handle assembly 44 including a pair of legs 46 disposed in straddling relationship to main frame 12 and respectively fixed, by bolts 48 (only the left one is shown), to respective channel members 12 and 14, and handle bar grips 45 located at upper end of handle assembly 44.

Attached to side member of handle assembly 44 by a bolt 50 is a clutching lever 52 which pivots about bolt 50 from a unclutched or raised position disposing belt drive mechanism 42 in its slack non-powered position, as shown in dashed lines in FIG. 1, to a clutched or lowered position disposing belt drive mechanism 42 in its respective engagement position whereby idler pulley 54 is in contact with belt 36 through which work unit 24 is engaged with motor output shaft 32, as illustrated in solid lines in FIG. 1.

The foregoing general orientation of parts corresponds to an earthworking device as described and disclosed in corresponding U.S. patent application Ser. No. 595,958 filed Apr. 2, 1984, in the name of Durrant et al entitled CULTIVATOR DRAG BAR AND MOUNTING THEREFOR and assigned to the assignee of this application.

As appears in dashed lines in FIG. 1, belt drive tensioning mechanism 42 is disposed in its respective non-power engagement position and pivotally mounted to a portion of internal combustion engine 30 by means of a idler arm locking bracket 57, series of washers 59 and bolt 56.

Bolt 56 is located centrally and extends through idler arm locking bracket 57 and on through crank 58, and defines an axis about which the drive mechanism 42 may be rotated through clutching or releasing the operating lever 52, from a lowered position in which lever 52 is disposed in respective power engaging position, (solid lines) to a raised position disposing drive mechanism 42 in its respective non-power position, (dashed lines), respectively.

Specifically, belt tensioning mechanism 42 comprises a belt drive tensioning lever 58, formed from a bell shaped crank or other idler arm assembly, having idler pulley 54 attached to its upper end and being operably attached at the opposite end to a clutch cable spring 60 which is connected to the control cable 62. The control cable 62 extends from the rotary adjusting means 64 downward to clutch cable spring 60.

Figure 2:
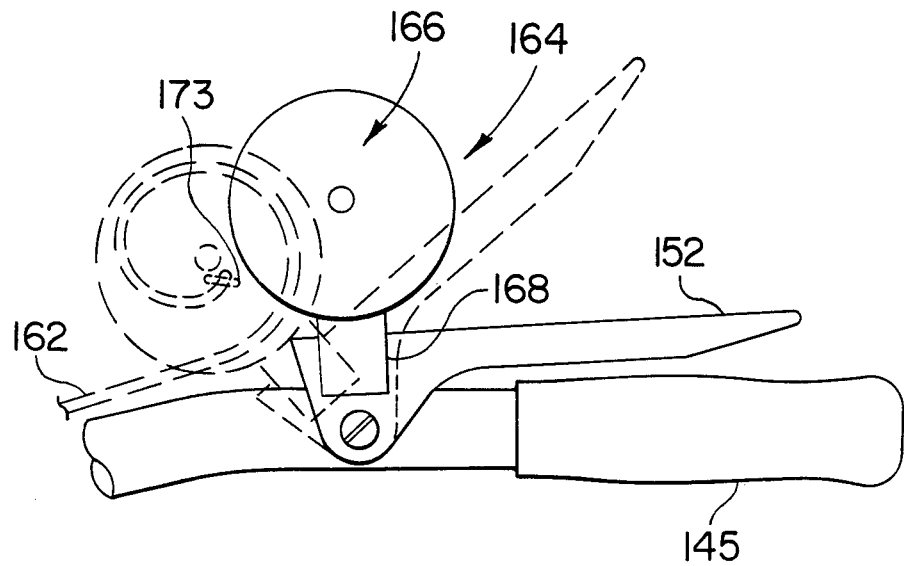
FIG. 2 is a plan view of the operating lever and rotary adjuster.

As illustrated in FIG. 2 which incorporate the same numbers used in FIG. 1 increased by 100, the non-incremental rotary adjusting means 164 includes a lever mounted adjustment spool or wheel 166 which is suspended above lever 152 by a strap 168 which is welded to lever 152.

Figure 3:
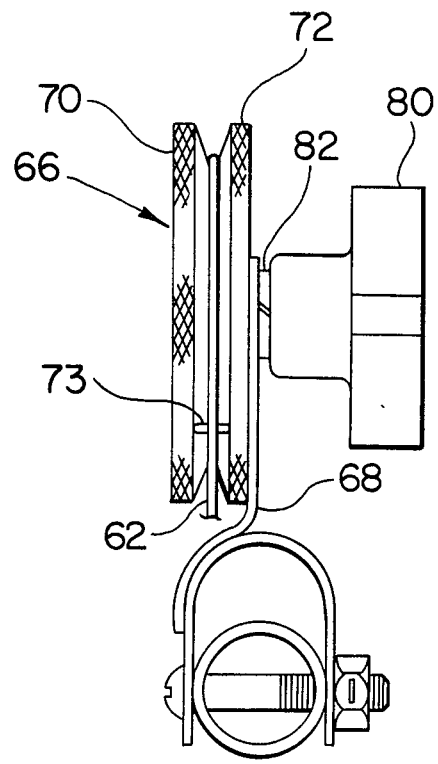
FIG. 3 is an isometric view of the rotary adjusting handle knob and guide handle taken along line 3—3 of FIG. 1.

As seen in FIG. 3, lever mounted wheel 66 comprises two circular plates 70 and 72 having cooperating parts fixed together forming a "V" shaped area between closely spaced portions of the plates 70 and 72 thus forming means for confining control cable 62 between plates 70 and 72 and provides an area around which control cable 62 is looped for adjustable rotation around the circumference of wheel 66. An opening 73 (also shown in FIG. 2 dashed lines) is provided in plates 70 and 72 such that cable 62 is inserted to hold cable 62 in position for circumferentially adjusting the length of cable 62 around wheel 66.

Wheel 66 is rotatably attached to handle member 80, which serves as the guiding mechanism for the apparatus, by a threaded shaft 82 extending from handle member 80 through a threaded opening which extends axially through a series of holes located in the center of plates 70 and 72 of wheel 66 and strap 68. To effect selective adjustment of the length of cable and thereby increase or decrease the clutching cable tension to ensure proper operation of the work unit, the handle member 80 is rotated to loosen it from its friction locked position against wheel 66 and strap 68. Wheel 66 is then manually rotated to a desired position to remove any slack in cable 62. By retightening handle member 80 into threaded shaft, wheel 66 is locked into position thereby holding cable 66 in a desired position and at a desired length to ensure proper engagement of work unit 24.

The operation of the non-incremental belt tension adjuster is as follows. With lever 52 being disposed in its unclutched or raised position as shown in dashed lines in FIG. 1 and with drive mechanism 42 in its raised position as shown in its dashed lines in FIG. 1, the power transmission between pulley 32 and 34 and is interupted. Drive belt 36 is then tensioned by manually clutching lever 52 (solid lines) which causes cable 62 to rotate drive mechanism 58 at pivot point 56 establishing contact between idler pulley 54 and drive belt 36 (solid lines) to establish a powering relationship between engine 30 and work unit 24.

As can be seen from the foregoing detailed description, the present invention provides an improved apparatus for selectively controlling the tension in a clutching cable. The improvement eliminates over tensioning of the belt drive as heretofore found in conventional adjustment devices and facilitates the quick, safe and easy adjustment of drive belt tension while requiring a reduced number of adjustment steps to accomplish the objects of the invention.

As will be apparent to persons skilled in the art, various modifications, adaptations and variations of the foregoing specific disclosure can be made without departing from the teachings of this invention.

I claim:

1. For use in a powered apparatus having a main frame and a motor having an output shaft, a non incremental belt tension adjuster for selectively connecting the motor output shaft to a work unit and comprising:
    (a) an operating lever;
    (b) a rotary cable adjusting means carried by said operating lever;
    (c) a control cable fixed to said rotary cable adjusting means;
    (d) a belt drive tensioning lever movable between two positions, a belt drive engagement position and a slack non-power transmitting position, being operably connected to said control cable; and
    (e) means for selectively changing and fixing the position of said rotary cable adjusting means to effect non-incremental selective adjustment of the length of said control cable between said operating lever and said drive tensioning lever thereby to compensate for any wear or stretching of a belt drive to ensure the desired engagement of output shaft and work unit.

2. The non-incremental belt tension adjuster of claim 1 further comprising a spring attached between said belt drive tensioning lever and said control cable thereby to reduce the initial shock loading on a drive belt upon deflection of said tensioning lever to engage drive mechanism with belt drive.

3. The non-incremental belt tension adjuster of claim 1 or 2 wherein said rotary adjusting means is a rotably supported wheel having a circumferential "V" groove over which said control cable passes and friction locking means is provided for fixing the rotated position of said wheel relative to the operating lever.

4. The non-incremental belt tension adjuster of claim 1 or 2 wherein said belt drive tensioning lever consists of :
    (a) a bell crank connected to said control cable at one end and pivotably mounted about a fixed point on the frame for engagement and disengagement with the belt drive; and
    (b) an idler pulley mounted on the opposite end of said bell crank from said control cable, around which the drive belt for the powered apparatus passes for use in engaging the motor.

5. The non-incremental belt tension adjuster of claim 1 or 2 whereby the means for changing and fixing the position of said rotary adjusting means is a locking device comprising a centrally mounted shaft extending from a handle member rotatably mounted on said rotary adjusting means for use in securing the rotary adjusting means in the desired position.

6. For use in a powered apparatus having a main frame and a motor with an output shaft supported on the frame for operably driving a variety of user selected work attachments units which are attached to the apparatus, each such attachment having a drive pulley for engagement with the motor output shaft through the operation of a drive belt, a non-incremental belt drive tension adjusting assembly comprising
    (a) an operating lever;
    (b) a rotary cable adjusting means carried by said operating lever;
    (c) a control cable operably connected to said rotary cable adjusting means;
    (d) a spring attached to said control cable which acts to reduce the initial shock on a drive belt occasioned when the motor output shaft is engaged with the work unit;

(e) a belt drive tensioning lever moveable between two positions, a belt drive engagement position and a slack non-power transmitting position, being operably connected to said control member; and (f) means for selectively changing and fixing the position for said rotary cable adjusting means to effect non-incremental selective adjustment of the length of said control cable between operating lever and belt drive tensioning lever thereby to allow deflection of the belt drive and to effect driving equipment of the motor output shaft to the work attachment unit.

7. The non-incremental belt tension adjusting assembly of claim 6 wherein said operating lever is connected to the frame through attachment to a guiding mechanism.

8. The non-incremental belt tension adjusting assembly of claim 6 wherein said rotary cable adjusting means is a rotably supported wheel having a circumferential "V" groove and over which said control cable passes allowing for non-incremental circumferential adjustment of said control cable and friction locking means is provided for fixing the rotated position of the wheel relative to said operating lever.

9. The non-incremental belt tension adjusting assembly of claim 6 whereby the belt drive tensioning mechanism consists of:

(a) a bell crank pivotally mounted on the frame for movement between a belt engagement position and a slack non-powered position and being attached at one end to said spring; and (b) an idler pulley affixed at the opposite end of said bell crank and around which the drive belt for the work attachment unit passes for use in engaging the power drive.

10. The non-incremental belt tension adjusting assembly of claim 6 whereby the means for changing and fixing the position of said rotary cable adjusting means is a locking device comprising a centrally mounted shaft extending from a handle member rotably mounted on said rotary cable adjusting means for use in securing said rotary adjusting means in the desired position.

11. The non incremental belt tension adjuster of claim 3 or 8 wherein said wheel is further defined by;

a first plate rotatably mounted relative to the operating lever; a second plate mounted related to the operating lever and adjacent first plate; and a knob interconnecting first and second plate to form a groove over which said control cable passes for securing cable in a desired fixed position to thereby selectively adjust the length of the control cable.

* * * * *

UNITED STATES PATENT AND TRADEMARK OFFICE
CERTIFICATE OF CORRECTION

PATENT NO. : 4,564,358
DATED : January 14, 1986
INVENTOR(S) : John T. Durrant

It is certified that error appears in the above—identified patent and that said Letters Patent is hereby corrected as shown below:

"Column 5, lines 11 and 12, wherein the word "equipment" should be --engagement--.

Signed and Sealed this

Fifteenth Day of July 1986

[SEAL]

Attest:

DONALD J. QUIGG

Attesting Officer

Commissioner of Patents and Trademarks